United States Patent [19]

Dannert et al.

[11] 4,260,887

[45] Apr. 7, 1981

[54] ELECTRORADIOGRAPHIC RECORDING DEVICE

[75] Inventors: Horst Dannert, Aachen-Walheim; Hans-Jürgen Hirsch, Selfkant-Tüddern, both of Fed. Rep. of Germany

[73] Assignee: U.S. Philips Corporation, New York, N.Y.

[21] Appl. No.: 830,629

[22] Filed: Sep. 6, 1977

[30] Foreign Application Priority Data

Sep. 11, 1976 [DE] Fed. Rep. of Germany ....... 2641067

[51] Int. Cl.[3] .............................................. G03B 41/16

[52] U.S. Cl. .................................................. 250/315.2

[58] Field of Search ......................... 250/315 R, 315 A

[56] References Cited

U.S. PATENT DOCUMENTS

| | | | |
|---|---|---|---|
| 2,825,814 | 3/1958 | Walkup | 250/315 A |
| 3,543,025 | 11/1970 | Stanton | 250/315 A |

*Primary Examiner*—Craig E. Church

*Attorney, Agent, or Firm*—Thomas A. Briody; Robert T. Mayer; Paul R. Miller

[57] ABSTRACT

An electroradiographic display with a high picture quality at low radiation intensities is obtained with a device consisting of a source of X-rays, an electrode passing X-rays, an intermediate recording space for an object to be displayed, an electrode on the side remote from the recording space on which a layer of dielectric material is disposed, and a second electrode with a photoconductive layer. The layers are separated by a gas gap which is bounded by one or more side walls. A direct voltage source is in electrical contact with the electrodes. The photoconductive layer comprises a granular photoconductive material in a binder. The gas gap between the dielectric layer and the photoconductive layer is from 50 to 500 $\mu$m wide and the electrode passing X-rays has a surface resistance between $10^3$ to $10^8$ Ohms.

7 Claims, 1 Drawing Figure

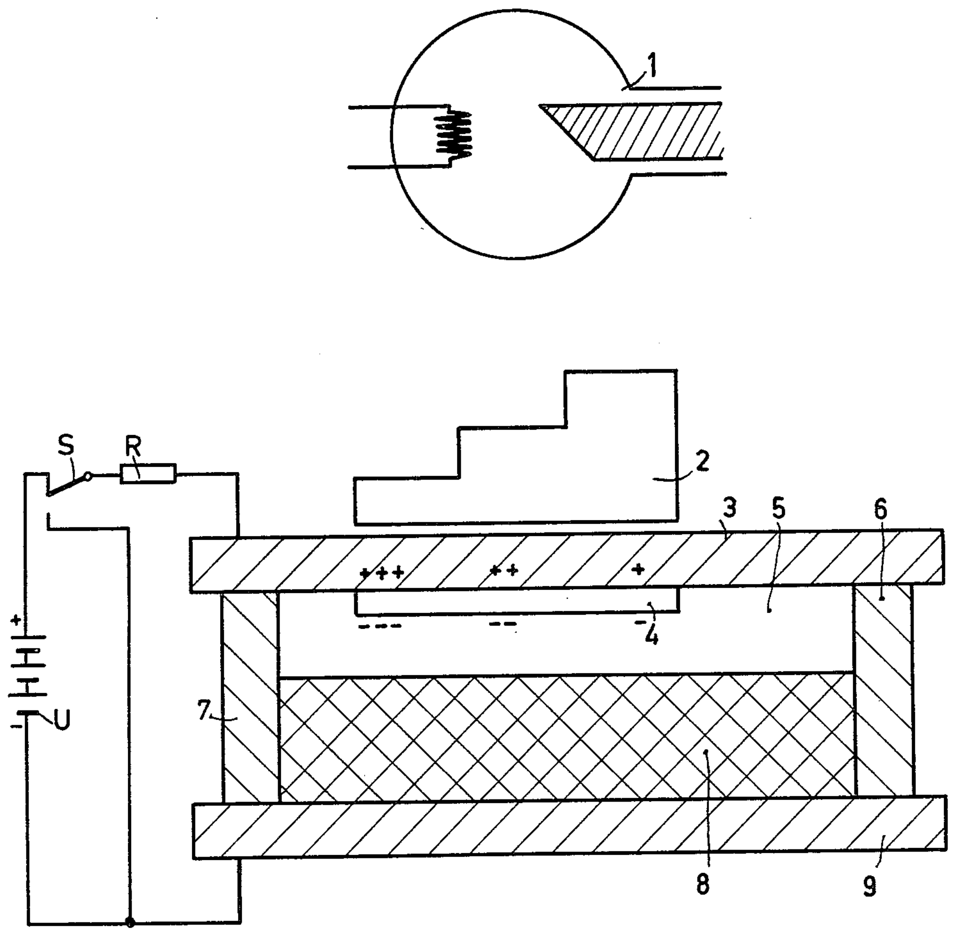
1
2
3
5
6
4
7
8
9
S
R
U

ELECTRORADIOGRAPHIC RECORDING DEVICE

The invention relates to an electroradiographic recording device comprising a source of X-ray radiation, an electrode passing X-rays; an intermediate recording space for an object to be displayed. The electrode on a side remote from the recording space being provided with a layer of dielectric material; a second electrode which has a photoconductive layer, the dielectric and the photoconductive layers facing each other and being separated by a gas gap, the gas gap being bounded by one or more side walls arranged between the electrodes; and a direct voltage source in electrical contact with the electrodes.

Electroradiographic recording is a special form of the electrophotographic recording. Whereas in electrophotography light rays are used for the recording, electroradiography uses X-rays or other directly ionizing rays. In both cases the photoconductive layer in the nonradiated condition has a high resistivity (approximately $10^{14}$ Ohm.cm) which is lowered upon radiation. This layer is charged electrostatically in the non-radiated condition. Upon local exposure with a pattern of ionizing radiation the surface charges on the exposed places are reduced by photoconduction. A charge image results which can be developed to a visible image by means of a powdered or liquid toner. It is also known, however, to obtain a latent electrostatic image on an insulating image recording surface by providing the image recording surface very close to a photoelectric layer, subjecting the photoelectric layer pictorially to a radiation distribution, for example by X-ray radiation, and applying an electrical field between the insulating picture recording surface and the photoelectric layer (German Auslegeschrift No. 1063899).

It is disclosed in German Auslegeschrift No. 1610757 that in the manufacture of a device in which a charge image is produced on a photoconductive layer and is transmitted to a dielectric image receiving material, either a precisely adjusted air gap of 50 to 200 $\mu$m exists between the two layers, or the layers are in nominal contact, or an intimate contact is obtained by using high mechanical pressure.

When a constant air gap of approximately 50 to 200 $\mu$m is maintained, a non-sharp image is produced which is particulary evident in reproducing small details, such as small characters (German Auslegeschrift No. 1810757). Accordingly, according to the German Auslegeschrift No. 1063899 the image recording insulator surface must be maintained at a distance of at most 20 $\mu$m from the photoconductive layer during the image formation. In German Offenlegungsschrift Nos. 1597905, 1622370, 1622371 and 1622372 a nominal contact of 10 $\mu$m, partly the use of mechanical pressure is described.

It is the object of the invention to provide an electroradiographic recording device with which the object is displayed with high picture quality while using small radiation intensities.

According to the invention this object is achieved by a device in which the photoconductive layer consists of a granular photoconductive material in a binder; the gas gap between the dielectric and the photoconductive layer is between 50 to 500 $\mu$m wide, and the electrode passing the X-rays has a surface resistance of from $10^3$ to $10^8$ Ohm.

The granular photoconductive material is preferably a tetragonal lead monoxide, especially a tetragonal lead monoxide having a grain size of from 1 to 50 $\mu$m and, preferably from 5 to 20 $\mu$m, as suggested in a co-pending patent application Ser. No. 827,366 filed Aug. 24, 1977 and now U.S. Pat. No. 4,121,933 by H. Dannert, H. J. Hirsch, E. Klein and K. H. Panstruga. Said co-pending filed patent application corresponds to German Application No. P 2641018 and is incorporated herein by reference.

Another suitable granular photoconductive material is, for example, cadmium sulphide.

Materials selected from the group of the lacquer synthetic resins, for example such as polyvinyl carbazol, may be used as binders for the granular photoconductive material. The lacquer synthetic resins are described in Saechtling-Zebrowski "Kunststoff-Taschenbuch", 19th edition (Munich-Vienna 1974), pp. 445–448). The binder may be, for example, from 0.5% to 5% of the overall weight.

The second electrode which serves as a support for the photoconductive layer preferably consists of aluminium. Further suitable materials for the electrode are, for example, stainless steel, brass, steel, gold-vapour deposited glass and plexiglass.

The thickness of the photoconductive layer is preferably from 200 to 300 $\mu$m but may be increased without difficulty to 1 mm or more.

The dielectric layer on which the latent charge image is produced is preferably separated from the photoconductive layer by a gas gap with a thickness of from 80 to 120 $\mu$m, preferably 100 $\mu$m. Because the photoconductive layer used is porous, hollow spaces may be formed between the grains of the photoconductive material, the diameter of which spaces may exceed the dimensions of the grains. The depth of the rough surface of the layer is an important fraction of the gap width, that is approximately 15 $\mu$m; thus, there is not a significant separation between photoconductor and gas gap.

The gas gap and the pores of the layer may be filled with gases and gas mixtures. Gases which are particularly favorable are ambient air, oxygen and sulpurhexafluoride. Further suitable gases are, for example, rare gases with electronegative gas additions. Said gases can be used at pressures between approximately 0.5 and 5 atmospheres.

The dielectric layers may be, for example, strongly insulating polyterephthalate foils with a thickness of from 3 to 50 $\mu$m. Other suitable foil materials are polyethylene, polycarbonate and polyester. Thin foils are especially preferred.

An X-ray-passing electrode is provided on the side of the foils remote from the gas gap. The surface resistance of the electrode varies from a few ohms to $10^8$ ohms. It was found that the quality of the electrode has an important effect on for the image quality of the latent charge image after pictorial exposure. It has been established that a very small surface resistance, as it is realized, for example, by a conductive silver layer, always results in images having striking defects as occurs also when resistors are connected before the electrode. With surface resistances between $10^3$ Ohms per square cm. and $10^8$ Ohms per square cm. image defects are avoided and a resolving power of up to 10 line pairs per mm is obtained. With surface resistances of $10^5$ Ohms per square cm., images having a high resolving power and low noise were obtained. In order to obtain said values of the surface resistance, the electrode may comprise the following materials: vapour-deposited layers of metal (i.e. chromium-nickel), metal oxide (i.e. indium oxide), for liquids (i.e. glycerin with ionogenic additions), or electrically conductive liquids (i.e. alcohols). The vapour-deposited layers are, for example, a few hundred Å thick, the liquid layers are less than 1 mm thick.

A voltage is applied between the electrode and the carrier of the photoconductive layer. For ambient air, a 250 $\mu$m photoconductor thickness and a 100 $\mu$m gap width the voltage is approximately 2000 volts. When using $SF_6$ at atmospheric pressure the voltage may be increased to approximately 2500 volts. At lower gas pressures the voltages should be correspondingly lower.

The voltage across the device is chosen to be low enough so that no-self-supporting discharge occurs but is high enough so that when exposed to X-rays, a non-self-supporting dischargecurrent which is as high as possible flows. Incident X-rays thus produce two effects:

I. A few rapid photoelectrons formed in the photoconductive layer by absorption by X-ray quanta may land in the gas gap. The electrons formed by thermalization are then accelerated in the electrical field and may cause electron multiplication. Recombination of electronegative gas constituents terminates the multiplication. The collected negative charge carriers are transported in the electrical field to the dielectric foil. Thus, up to this point, the mechanism is in principle the same as in a spark chamber.

II. Simultaneously the photoconductive layer becomes conductive by absorption of X-rays. With a constant voltage across the whole device, this results in an increase of the voltage across the gas gap. These increased fields in the gap, however, control the charge carrier multiplication processes.

An embodiment according to the invention is shown in the drawing and will be described in detail hereinafter. The FIGURE is a diagrammatic representation of an embodiment of the device according to the invention as a side elevation. In the FIGURE, reference numeral 1 denotes an X-ray tube the rays (not shown) from which pass through a test object 2. In the drawing the test object is shown as a stepped wedge. An electrode 3, adapted for passing X-rays, closes the device adjacent the object. On the side of the electrode 3 remote from the test object a dielectric foil 4 is provided. Adjoining the foil 4 is a gas gap 5 which is bounded by insulating side walls 6 and 7. Opposing the foil 4 on the other side of the gas gap 5 is a photoconductive layer 8 which is disposed on a second electrode 9.

As shown in the FIGURE, prior to the actual exposure to X-rays, a direct voltage U is applied to the two electrodes 3 and 9 via a switch S with a positive polarity on the electrode 3. A resistor R is in the direct current circuit. Opposite polarity is, in principle, also possible but provides a lower sensitivity in the gases described. With the preferred parameter data of 250 $\mu$m photoconductor thickness, 100 $\mu$m gas gap thickness, and 1 atmosphere air; the voltage is 2000 volts. Immediately after applying the direct voltage of, for example 2000 volts, a quantity of charge flows to the foil 4 via the gas gap 5. During development the charge becomes noticeable as a background. Various possibilities to avoid the background exist:

(A) When developing in a liquid with a counter electrode the background can be compensated with a bias voltage.

(B) The background can be compensated by inverting the polarity of the applied voltage.

(C) The charge transfer to the dielectric foil 4, after applying the voltage, is associated with a "forming" of the photoconductive layer 8. On the basis of this process, which is not yet clarified in detail, it is possible to replace a foil having a background charge by a new uncharged foil without this taking up further charges.

X-ray exposure takes place after the treatments B and C.

After exposure, the voltage U is switched off by means of the switch S, the electrodes 3 and 9 are short-circuited, and the foil 4 and the photoconductor 8 are separated. The charge image may then be developed.

What is claimed is:

1. In an electroradiographic recording device having a source of X-rays, a first electrode adapted for passing X-rays spaced from said X-ray source and defining therebetween a recording space for an object to be examined, a layer of dielectric material disposed on the side of said first electrode remote from said recording space, a second electrode spaced from said first electrode, a photoconductive layer disposed on the side of said second electrode adjacent said dielectric material, said photoconductive layer and said dielectric material being spaced from each other to define a gas gap therebetween, said gas gap being bounded by at least one side wall arranged between said electrodes, and a direct voltage source connected between said electrodes, an improvement wherein said photoconductive layer comprises a granular photoconductive material in a binder, said gas gap between said dielectric material and said photoconductive layer is between 50 $\mu$m and 500 $\mu$m wide, and said first electrode has a surface resistance between $10^3$ to $10^8$ Ohms per square.

2. A device as claimed in claim 1, wherein the first electrode comprises chromium-nickel vapour-deposited layers and has a surface resistance between $10^4$ and $10^6$ Ohms per square cm.

3. A device as claimed in claim 1, wherein the first electrode comprises glycerin with an ionogenic addition and has a surface resistance between $10^4$ and $10^6$ Ohms per square cm.

4. A device as claimed in claim 1, wherein the photoconductive layer comprises tetragonal lead monoxide with a grain size between 1 $\mu$m and 50 $\mu$m.

5. A device as claimed in claim 1, wherein the gas gap is between 80 $\mu$m and 120 $\mu$m wide.

6. A device as claimed in claim 5, wherein the gas gap is filled with air at a pressure between 0.8 and 1.2 atmosphere.

7. A device as claimed in claim 5, wherein the gas gap is filled with sulphur hexafluoride at a pressure between 0.5 and 1.2 atmospheres.

* * * * *